United States Patent [19]

Sekimura et al.

[11] Patent Number: 5,078,475
[45] Date of Patent: Jan. 7, 1992

[54] FLC DEVICE WITH COLOR FILTER AND INSULATING PROTECTION LAYER WITH PENCIL HARDNESS OF AT LEAST HB

[75] Inventors: Nobuyuki Sekimura, Kawasaki; Akio Yoshida, Fujisawa; Masaki Kuribayashi, Higashi-kurume; Masaru Kamio, Atsugi; Hideaki Takao, Sagamihara; Tatsuo Murata, Atsugi, all of Japan

[73] Assignee: Canon Kabushiki Kaisha, Tokyo, Japan

[21] Appl. No.: 328,706

[22] Filed: Mar. 27, 1989

Related U.S. Application Data

[63] Continuation of Ser. No. 941,795, Dec. 15, 1986, abandoned.

[30] Foreign Application Priority Data

| Dec. 18, 1985 [JP] | Japan | 60-285283 |
| Jan. 22, 1986 [JP] | Japan | 61-12338 |
| Feb. 28, 1986 [JP] | Japan | 61-41556 |

[51] Int. Cl.$^5$ .............................................. G02F 1/13
[52] U.S. Cl. ............................ 359/68; 359/79; 359/81; 359/76; 359/104
[58] Field of Search ........... 350/339 F, 339 R, 340, 350/341, 344, 350 S

[56] References Cited

U.S. PATENT DOCUMENTS

| 3,912,365 | 10/1975 | Lowell | 350/344 |
| 4,367,924 | 1/1983 | Clark et al. | 350/350 S |
| 4,560,241 | 12/1985 | Stolov et al. | 350/339 R |
| 4,593,978 | 6/1986 | Mourey et al. | 350/350 S |
| 4,632,514 | 12/1986 | Ogawa et al. | 350/339 F |
| 4,709,991 | 12/1987 | Hoshikawa | 350/339 R |
| 4,712,873 | 12/1987 | Kanbe | 350/337 |
| 4,712,875 | 12/1987 | Tsuboyama et al. | 350/350 S |
| 4,712,878 | 12/1987 | Taniguchi et al. | 350/350 S |
| 4,744,637 | 5/1988 | Sekimura et al. | 350/339 F |
| 4,775,225 | 10/1988 | Tsuboyama et al. | 350/344 |
| 4,818,429 | 4/1989 | Saito et al. | 350/350 S |
| 4,879,144 | 11/1989 | Nakura et al. | 350/350 S |

FOREIGN PATENT DOCUMENTS

| 2534052 | 4/1984 | France . | |
| 2563018 | 10/1985 | France . | |
| 0151055 | 11/1979 | Japan | 350/339 R |
| 0000613 | 1/1982 | Japan | 350/344 |
| 29225 | 5/1984 | Japan . | |
| 0017720 | 1/1985 | Japan | 350/339 R |
| 218425 | 4/1985 | Japan . | |
| 84529 | 9/1985 | Japan . | |
| 0184227 | 9/1985 | Japan | 350/350 S |
| 0113030 | 5/1986 | Japan | 350/339 F |
| 2137397 | 10/1984 | United Kingdom . | |

OTHER PUBLICATIONS

Ferroelectrics, vol. 59 (1984) 25:67.
Proc. Sid., vol. 24, No. 2 (1983) 163:7.

*Primary Examiner*—Stanley D. Miller
*Assistant Examiner*—Trong Phan
*Attorney, Agent, or Firm*—Fitzpatrick, Cella, Harper & Scinto

[57] ABSTRACT

A liquid crystal device comprises a pair of substrates and a ferroelectric liquid crystal disposed between the substrates. At least one of the substrates has thereon a color filter layer and a protection layer for preventing direct contact between the color filter and the ferroelectric liquid crystal. Particulate spacers are preferably disposed between the substrates. The protection layer preferably comprises a film having a pencil hardness of HB or harder (JIS K 5401).

23 Claims, 6 Drawing Sheets

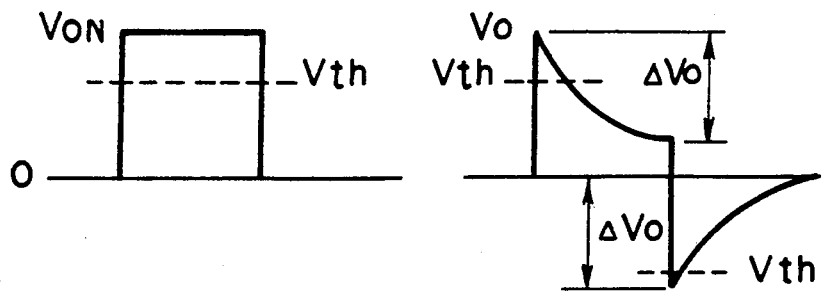
FIG. 1A   FIG. 1B
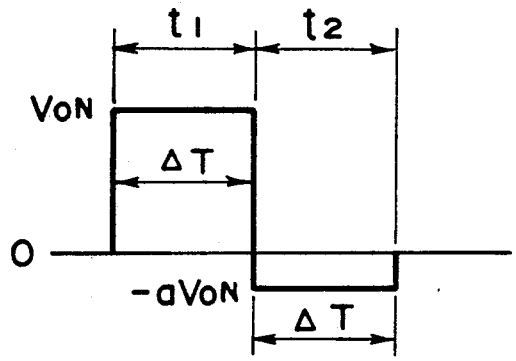 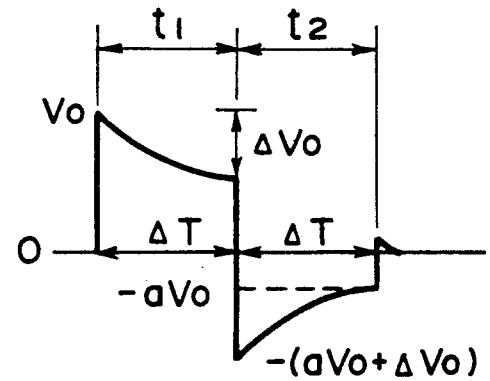
FIG. 2A   FIG. 2B
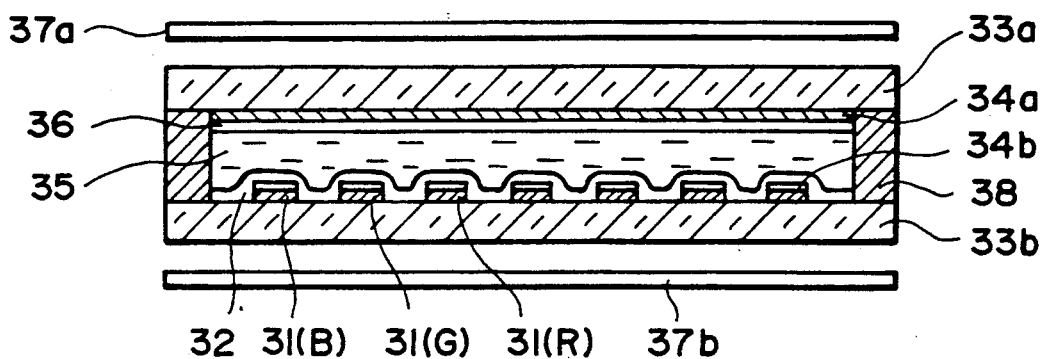
FIG. 3

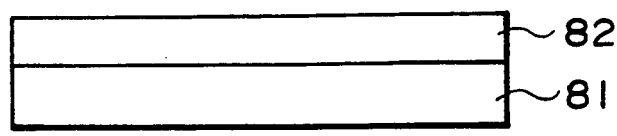
F I G. 8A
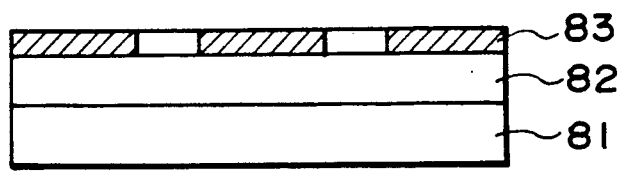
F I G. 8B
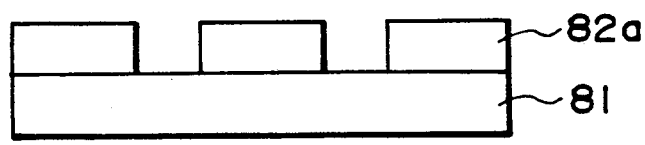
F I G. 8C
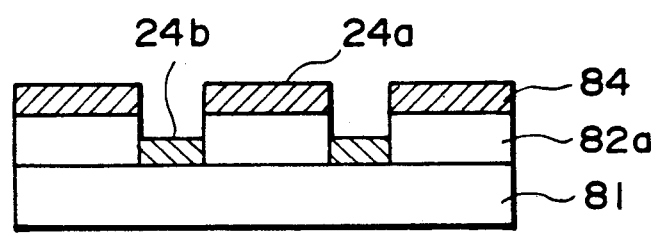
F I G. 8D
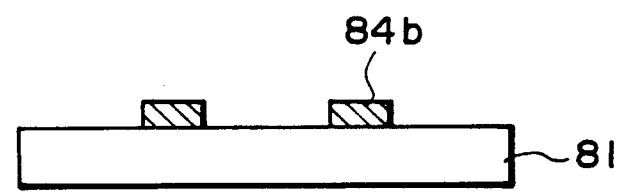
F I G. 8E
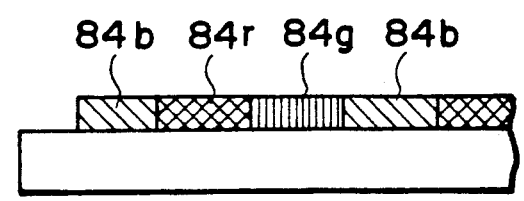
F I G. 8F

FLC DEVICE WITH COLOR FILTER AND INSULATING PROTECTION LAYER WITH PENCIL HARDNESS OF AT LEAST HB

This application is a continuation of application Ser. No. 941,795 filed Dec. 15, 1986, now abandoned.

FIELD OF THE INVENTION AND RELATED ART

The present invention relates to a ferroelectric liquid crystal device adapted to a color display, particularly a color television panel.

In the conventional liquid crystal television panel of the active matrix driving system, thin film transistors (TFTs) are arranged in matrix corresponding to respective pixels. When a gate-on pulse is applied to a TFT to turn on the source-drain channel, a picture image signal is applied to the source and stored in a nematic) liquid crystal) is driven by the stored image signal and a color display is effected by switching the pixels each provided with a color filter layer.

However, such a television display panel of the active matrix driving system using a TN liquid crystal uses complicated structure of TFTs requiring a large number of production steps and is accompanied with a difficulty of high production cost. Moreover, there is a further problem that it is difficult to provide a large area of semiconductor film (e.g., of polysilicon, amorphous silicon) constituting TFTs.

On the other hand, a display panel of a passive matrix driving type using a TN liquid crystal has been known as one of a low production cost. However, in this type of liquid crystal display panel, when the number (N) of scanning lines is increased, a time period (duty factor) during which one selected point is subjected to an effective electric field during the time when one frame is scanned is decreased at a ratio of 1/N, whereby crosstalk occurs and a picture with a high contrast cannot be obtained. Furthermore, as the duty factor is decreased, it is difficult to control gradation of respective pixels by means of voltage modulation so that this type of display is not adapted for a display panel of a high pixel or wiring density, particularly one for a liquid crystal television panel.

In order to solve the essential problems of the conventional TN liquid crystal devices, there have been proposed ferroelectric liquid crystal devices as disclosed by, for example, U.S. Pat. No. 4,367,924 to Clark and Lagerwall.

However, the application of such a ferroelectric liquid crystal device to a color display, particularly a color television panel, involves a problem as described below.

More specifically, a most convenient color display system using a liquid crystal device is one wherein respective color units of a color stripe filter or a color mosaic filter are optically switched or shuttered by driving a liquid crystal, especially one wherein color pixel units formed by arranging respective intersections of matrix electrodes corresponding to color units are switched line-sequentially.

However, in a liquid crystal device used in the above described system, as a color filter layer is disposed on one side of the intersecting electrodes for each color pixel unit, it has been found that such a liquid crystal device fails to provide a normal color display when such a liquid crystal device is used for a long period of time.

SUMMARY OF THE INVENTION

A principal object of the present invention is to provide a ferroelectric liquid crystal device capable of stably effecting a color display, particularly a color television display, for a long period of time.

More specifically, according to the present invention, there is provided a liquid crystal device comprising a pair of substrates and a ferroelectric liquid crystal disposed between the pair of substrates, at least one of the pair of substrates having thereon a color filter layer and a protection layer for preventing direct contact between the color filter layer and the ferroelectric liquid crystal.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 1A and 1B show a set of voltage waveforms for writing; FIGS. 2A and 2B show another set of voltage waveforms for writing;

FIG. 3 is a sectional view of an embodiment of the liquid crystal device according to the present invention;

FIGS. 8A-8F are sectional views for illustrating steps for preparing a color filter layer used in the present invention;

DETAILED DESCRIPTION OF PREFERRED EMBODIMENTS

Figure 4:
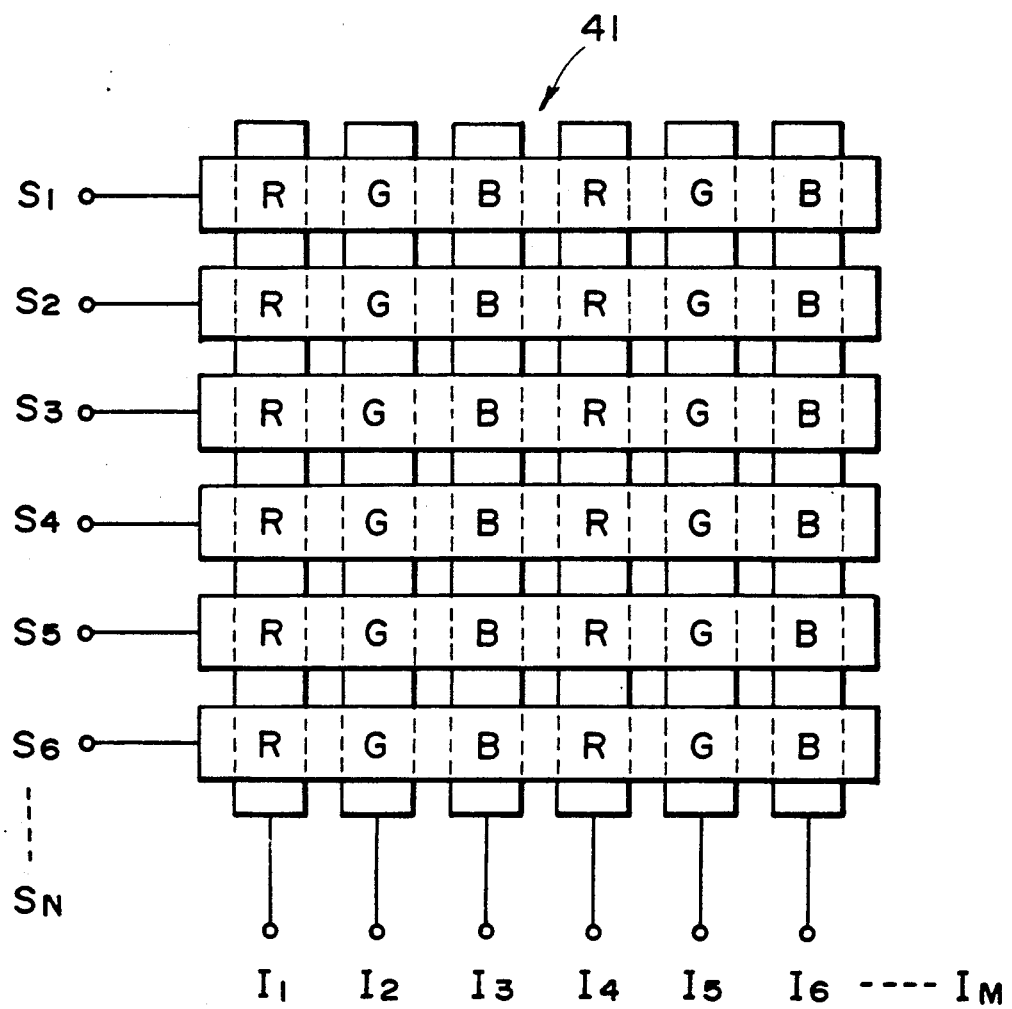
FIG. 4 is a plan view of a ferroelectric liquid crystal cell as applied to a display panel.

FIG. 1A shows a driving voltage waveform applied to a pixel of a ferroelectric liquid crystal (hereinafter sometimes abbreviated as "FLC", and FIG. 1B shows a voltage waveform actually applied to the liquid crystal per se. More specifically, when a writing pulse $V_{ON}$ is applied to intersecting electrodes as described above sandwiching the FLC, the voltage waveform actually applied to the FLC decreases from a voltage $V_0$ applied at the instant of the pulse application by $\Delta V_0$ which corresponds to a time constant $\tau = RC$ (R: resistance of the FLC; C: capacitance of the FLC) and becomes layer as the resistance R of the FLC is smaller, and as a result, a reverse polarity of voltage $-\Delta V_0$ is applied to the ferroelectric liquid crystal at the time of pulse switching (pulse falling down). If the voltage $|-\Delta V_0|$ exceeds a switching or inversion threshold voltage $|-V_{th}|$, writing of, e.g., "black" reverse to "white" is caused. This is caused by generation of a reverse electric field $(-\Delta V_0)$ due to discharge from a capacitance of a dielectric layer such as an alignment control film connected in series to the ferroelectric liquid crystal.

Incidentally, in the liquid crystal device for color display as described above, a color filter is disposed inside the cell, and a dye in the color filter layer can be eluted in the ferroelectric liquid crystal within the cell, so that there arises a problem that when such a ferroelectric liquid crystal device is used for a long period of time, the resistance of the FLC is decreased with the elapse of time, until the above mentioned reverse polarity of voltage $-\Delta V_0$ exceeds the switching threshold voltage to fail to effect desired optical switching operation.

Further, application of a line-sequential writing scheme to an FLC may be effected by applying in a first phase $t_1$ a pulse for providing a first display state based on a first orientation state of the FLC to all or a part of the pixels on a line, and applying in a second phase $t_2$ a pulse for switching the first display state to a second display state based on a second orientation state of the FLC to a selected pixel.

In this system, in the phase $t_2$, a pulse of a polarity opposite to that of the pulse applied in the phase $t_1$ and having a voltage below the threshold voltage is applied to a picture element which is to retain the first display state as shown in FIG. 2A. In this way, in such a line-sequential writing scheme, a certain pixel is required to retain the first display state, which has resulted in the phase $t_1$, in the phase $t_2$. Accordingly, a voltage exceeding the threshold voltage should not be applied to the pixel. As a result of our study, however, a voltage of $-(aV_0+\Delta V_0)$ (a is a parameter satisfying $a<|V_{th}|/|V_{ON}|$; $V_{th}$ is a threshold voltage of a FLC) is effectively applied to the FLC at the time of pulse switching from the phase $t_1$ to the phase $t_2$, and when the voltage of $-(aV_0+\Delta V_0)$ exceeds the switching threshold voltage, a pixel which is to retain the first display state is inverted to the second display state in the phase $t_2$, thus failing to provide a desired display.

In contrast thereto, in the present invention wherein a protection layer is disposed in a cell so as to cover a color filter layer, the dye in the color filter layer is prevented from being eluted or dissolved into the FLC so as to avoid the increase in reverse electric field $(-\Delta V_0)$ caused by the decrease in resistance of the FLC.

FIG. 3 is a sectional view of a liquid crystal device according to the present invention, comprising a color filter layer which in turn comprises a blue color filter layer 31(B), a green color filter layer 31(G) and a red color filter layer 31(R), each constituting one color pixel. Covering the color filter layer 31, a protection layer 32 for preventing direct contact between the color filter layer 31 and an FLC 35 is disposed. The protection layer 32 can also be provided with an insulating property and an alignment control property. Reference numerals 33a and 33b denote substrates comprising, e.g., a glass plate or a plastic film, on which stripe-form transparent electrodes 34a and 34b constituting matrix electrodes of ITO (indium-tin-oxide), etc., are provided. A layer 36 is an alignment control film and can be denote polarizers arranged in cross nicols, and reference numeral 38 denotes a sealing member for sealing the peripheral gap between the substrates 33a and 33b. The sealing member 38 can also function as a spacer.

The color filter layer 31 may be formed by coloring a layer of, e.g., polyvinyl alcohol or cellulose resin with a dye. Examples of the dye used for this purpose may include cyanine dyes, merocyanine dyes, azulenium dyes, anthoraquinone dyes, naphthoquinone dyes, phenolic dyes, disazo dyes, trisazo dyes, and tetrazo dyes.

Alternatively, the color filter layer used in the present invention may be formed by vapor deposition of various organic pigments. Examples of the organic pigments used for this purpose may include, copper-phthalocyanine pigment, lead-phthalocyanine, perylene pigments, indigo pigments, thioindigo pigments, disazo pigments, trisazo pigments, and tetrazo pigments.

In another preferred embodiment according to the present invention, the color filter layer 31 may be composed of a layer of, e.g., colored polyimide, colored polyamideimide, colored polyesterimide, or colored polyester. Particularly, polyamide (such as 6-nylon, 66-nylon or copolymer nylon) or polyester may be soluble in various organic solvents, and various organic pigments may be dispersed therein. Further, in order to color polyimide, polyamideimide or polyesterimide, it is possible to disperse an organic pigment in a solution of a polyamic acid as a precursor of the polyimides together with a dispersant such as an azo dye, phthalocyanine dye or triphenylmethane dye having a substituent such as a hydroxyl group, carboxyl group, sulfonic acid group, carbonamide group or sulfonamide group. Such a colored film is extremely good in adhesiveness with a protection layer 32 and can provide good results.

The protection layer 32 used in the present invention may be formed of any material selected from inorganic insulating materials such as silicon nitride, silicon nitride containing hydrogen, silicon carbide, silicon carbide containing hydrogen, silicon oxide, boron nitride, boron nitride containing hydrogen, cerium oxide, aluminum oxide, zirconium oxide, titanium oxide, magnesium fluoride, SiO and $SiO_2$; or organic insulating materials such as polyvinyl alcohol, polyimide, polyamideimide, polyesterimide, polyparaxylylene, polyester, polycarbonate, polyvinyl acetal, polyvinyl chloride, polyvinyl acetate, polyamide, polystyrene, cellulose resin, melamine resin, urea resin, acrylic resin and photoresist resin. The thickness of the protection layer may suitably be 5000 Å or less, preferably 100–5000 Å, particularly 500–3000 Å.

The capacitance of the protection layer 32 may be set to $5.5 \times 10^3$ pF/cm$^2$ or above so as to effectively preventing the above mentioned inversion phenomenon. The capacitance may preferably be in the range of $5.5 \times 10^3$ pF/cm$^2$–$3.0 \times 10^5$ pF/cm$^2$, particularly suitably be in the range of $9.0 \times 10^3$ pF/cm$^2$–$5.5 \times 10^4$ pF/cm$^2$ in order to also ensure a sufficient protecting and insulating ability.

Further, it is possible to subject the surface of the protection layer 32 to a uniaxial orientation treatment so as to provide an alignment control characteristic for the FLC 35.

It is preferred that the material constituting the protection layer 32 and the dye or pigment in the color filter layer 31 are selected from those which are not mutually soluble with each other. The term "mutually soluble" or "mutual solubility" used herein refers to a property that the material constituting the protection layer 31 and the dye or pigment are soluble in the same organic solvent. As for the solubility in this instance, if the protection layer and the dye or pigment are soluble at a rate of 1 g or more in 100 g of an organic solvent, when such a color filter layer 31 and a protection layer 32 are disposed in an FLC device, the dye or pigment in the color filter layer 31 penetrates into the protection layer 32 during a long period of use of the FLC device to lower the resistance of the FLC, whereby the above described erroneous operation is caused.

In this way, when the protection layer 32 used in the present invention is composed of a material having no mutual solubility with the dye or pigment in the color filter layer, the operation stability of the FLC device for a long period can be further increased. Further, the protection layer 32 can have a laminated structure comprising a plurality of layers.

Further, instead of providing a protection layer 32 on transparent electrodes 31b which in turn are formed on a color filter layer 31 as shown in FIG. 3, the protection layer 32 used in the present invention can be directly formed on a color filter layer 31 and transparent electrodes can be formed further thereon. In this case, it is preferred to provide another alignment control film (not shown) so as to cover the transparent electrodes 32b. Such an alignment control film may be formed of a material similar to that of the above mentioned protection layer 32, and may be subjected to a uniaxial orientation treatment such as rubbing after the film formation.

FIG. 4 is a schematic plan view of a color display panel using an FLC cell 41 according to the present invention. Referring to FIG. 4, $S_1$, $S_2$, $S_3$, ... denote scanning electrodes; $I_1$, $I_2$, $I_3$, ..., signal electrodes; R, a red pixel provided with a red color filter layer; G, a green pixel provided with a green color filter layer; and B, a vlue pixel provided with a green color filter layer.

Figure 5:
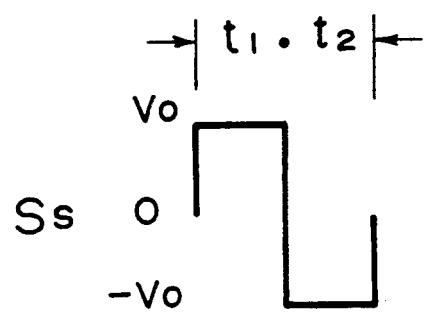
FIG. 5 shows signal waveforms for driving the panel.
Figure 5:
Figure 5:
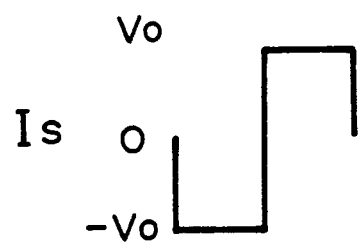
Figure 5:
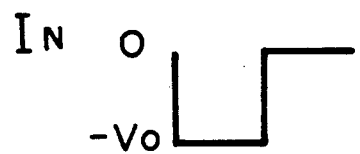

FIG. 5 shows signal waveforms for driving such a color display panel. Referring to FIG. 5, a scanning selection signal shown at $S_S$ are sequentially applied to the scanning electrodes $S_1$, $S_2$, ... The scanning selection signal may be sequentially applied to a first scanning electrode $S_1$, ... and an N-th scanning electrode in that order; or may be first sequentially applied to odd-numbered (or even-numbered) scanning electrodes and then sequentially applied to even-numbered (or odd-numbered) scanning electrodes. A signal waveform shown at $S_N$ is one of a scanning non-selection signal applied to a non-selected scanning electrode. Signal waveforms shown at $I_S$ and $I_N$ are respectively those of information signals applied to signal electrodes $I_1$, $I_2$, ... $I_N$, selectively. The signal shown at $I_S$ is one for providing a "black" state to a selected pixel on a selected scanning electrode, and $I_N$ is one for a "white" state. Such a driving method is described in British Laid-Open Patent Specification GB-A 2141279. More specifically, a voltage of $-2V_0$ exceeding one threshold voltage of an FLC is uniformly applied to pixels on a scanning electrode selected in a phase $t_1$ to provide a "white" state to the pixels based on the first stable state of the FLC. In a subsequent phase $t_2$, at a pixel to which a voltage $V_0$ of the information signal $I_S$ is applied, a voltage $2V_0$ exceeding the other threshold voltage of the FLC is applied, the pixel is brought to a "black" state based on a second stable state of the FLC. On the other hand, at a pixel to which a voltage of O of the information signal $I_N$ is applied, a voltage $V_0$ below the threshold voltage is applied, so that the "white" state formed in phase $t_1$ is retained without change.

The liquid crystal device according to the present invention can also be applied to driving methods as disclosed in, e.g., GB-A 2156131 and Japanese Laid-Open Application No. 172029/1985.

Incidentally, for a color display, it is generally required to form a large picture area with a diagonal size of, e.g., 12 inch or larger, it is necessary that a liquid crystal device applied to the systems as described above is formed as a panel with a large area.

In order to form a liquid crystal device with a panel size, a spacer member, e.g., in an elongated shape having a substantially larger length than a diameter such as glass fiber, or a substantially spherical or spheroidal shape such as glass beads, alumina beads or plastic beads, may be disposed between a pair of substrates forming the device so as to retain a uniform cell gap over the entire extension of the device. In a preferred embodiment of the present invention, spherical or spheroidal spacers may suitably be used.

According to our experiments, when a liquid crystal device for color display having inside thereof a color filter layer and a protection layer covering it was applied to a panel of a large area by disposing glass fiber as described above as a fibrous spacer between a pair of substrates, it was impossible to effect a normal color display. More specifically, according to our knowledge, the reason for the above failure to effect a normal driving is considered that in the preparation stage of a liquid crystal device, the glass fiber has pierced the protection layer to cause a direct contact between the FLC and the dye or pigment in the color filter layer, so that the dye or pigment is gradually eluted into the FLC. As a result, when such a liquid crystal device is used for a long period of time, the resistance of the FLC in the cell is lowered with the elapse of time, until a normal driving becomes impossible for a reason similar to that described above.

Thus, according to a second aspect of the present invention, there is provided a liquid crystal device comprising a pair of substrates and a ferroelectric liquid crystal disposed between the substrates, at least one of the substrates having thereon a color filter layer and a protection layer for preventing direct contact between the color filter layer and the ferroelectric liquid crystal, and particulate spacers being disposed between the substrates. Thus, if particulate spacers are used in combination with the protection layer covering the color filter layer in the cell, the elution or dissolution of the dye or pigment into the ferroelectric liquid crystal caused by breakage of the protection layer may be prevented, whereby the increase in voltage of a reverse polarity $(-\Delta V_0)$ attributable to the lowering in resistance of the FLC may be prevented.

Figure 6:
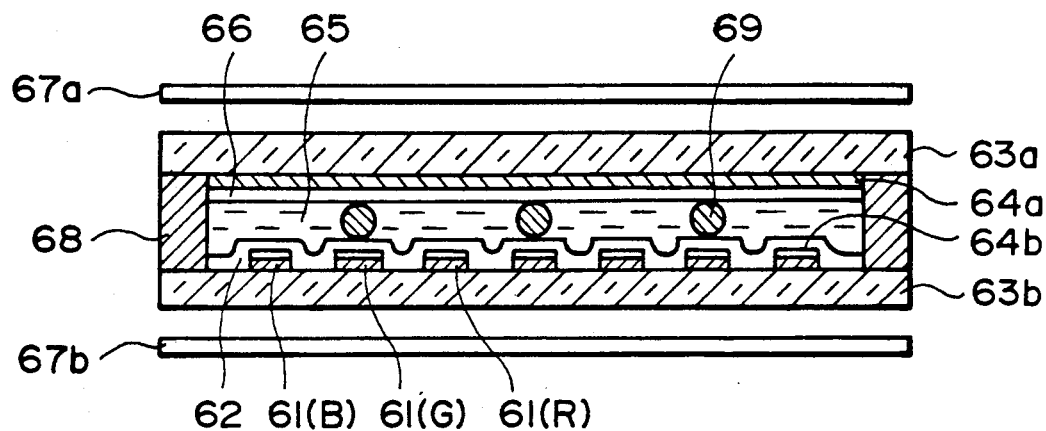
FIGS. 6 and 7 are sectional views of other embodiments of the liquid crystal device according to the present invention.

FIG. 6 is a sectional view of an embodiment of the liquid crystal device according to this aspect of the present invention applicable to a display of a large area. The liquid crystal device includes a color filter layer 61 comprising a blue color filter layer 61(B), a green color filter layer 61(G), and a red color filter layer 61(R), each constituting one color pixel. Covering the color filter layer 61, there is disposed a protection layer 62 for preventing direct contact between the color filter layer 61 and an FLC 65. The protection layer 62 can also be provided with an insulating property and an alignment control characteristic. Reference numerals 63a and 63b denote substrates comprising, e.g., a glass plate or a plastic film, on which stripe-form transparent electrodes 34a and 34b constituting matrix electrodes of ITO, etc., are provided. Between the pair of substrates 63a and 63b, particulate or bead spacers of a spherical shape such as glass beads, silica beads, alumina beads or plastic beads are disposed so as to control the spacing therebetween.

In the present invention, in order to provide an FLC device containing a ferroelectric liquid crystal having a non-helical structure as will be described hereinafter, alumina beads and silica beads are especially preferred because, they can be obtained to have an average particle size of 1-5 μm with a narrow particle size distribution. Particulate spacers 69 used in the present invention may be disposed at a rate of 0.1-15 per mm², preferably 0.5-10 per mm². If more than 15 particles are disposed per mm², particles 69 can be superposed to increase the tendency of a particle 69 breaking the protection layer 62. On the other hand, less than 0.5 particle per mm² fails to control a uniform spacing between the substrates 63a and 63b. Especially, in an FLC device with a non-helical structure described hereinafter, an extremely high accuracy of a cell gap is required so that the tolerance with respect to the uniformity of the cell gap is ±10%, whereby 0.5 or more particulate 69 per mm² is required.

The particles 69 used in the present invention may be distributed by dispersing, e.g., alumina beads or silica beads in a volatile liquid such as fluorinated methane, fluorinated ethylene, isopropyl alcohol or methanol, and spraying the dispersion onto at least one of the two substrates. Alternatively, they can also be distributed by dipping a substrate in such a dispersion of alumina beads or silica beads.

The color filter layer 61 and the protection layer 62 are similar to the color filter layer 31 and the protection layer 32 explained with reference to FIG. 3. Equally, it is preferred that the material constituting the protection layer 62 and the dye or pigment in the color filter layer 61 are not mutually soluble. Further, the transparent electrodes 64b may be disposed on the protection layer instead of between the color filter layer 61 and the protection layer 62. In such a case, a uniaxially orientation-treated alignment control film may preferably be disposed to cover the transparent electrodes.

According to a further preferred embodiment of the present invention, the protection layer 62 is formed to have a pencil hardness of HB or harder. In such a case, even if the particulate spacers 69 are disposed at a rate of more than 15 particles per mm², the breakage of the protection layer 62 can be avoided.

The "pencil hardness" used herein refers to a hardness measured by means of a "pencil scratch tester for coating films" according to JIS K 5401.

Examples of transparent insulating resins which may be used for providing a protection layer 62 having a pencil hardness of HB or harder may include rubber-type photoresists, thermosetting acrylic resin, polyimide, polyparaxylylene (e.g., Palylene (trade name), Union Carbide Corp.), polyethylene, polystyrene and polycarbonate. The protection layer may for example be formed by spinner coating. The protection layer 62 having such a hardness may also be formed with a transparent insulating inorganic compound such as $SiO_2$, $Al_2O_3$, $TiO_2$, $ZrO_2$, $MgF_2$ or $SiO$.

When the protection layer 62 is formed to have a pencil hardness of HB or harder, the breakage of the protection layer due to particulate spacers can be avoided. As a result, a surface roughness or unevenness on the substrate surface causing alignment defects is avoided, so that in a liquid crystal layer sandwiched between the substrates having a good planarity, a liquid crystal phase region is gradually developed during a cooling stage from the isotropic phase to the liquid crystal phase thereby to form a liquid crystal phase of a uniform monodomain.

When DOBAMBC showing a ferroelectric liquid crystal phase is taken as an example of a liquid crystal, and the DOBAMBC is gradually cooled from its isotropic phase, it is transformed into smectic A (SmA) phase at about 115° C. At this time, when a substrate is provided with a uniaxial orientation treatment such as rubbing or oblique vapor deposition of $SiO_2$, a monodomain wherein liquid crystal molecules are aligned with their molecular axes extending in parallel with the substrate and in one direction. On further cooling, DOBAMBC is transformed into chiral smectic C phase (SmC* phase) at a specific temperature between about 90°-75° C. depending on the liquid crystal layer thickness. Further, when the liquid crystal layer thickness is about 2μ or less, the helical structure of SmC* phase is unwound or released to provide a ferroelectric liquid crystal having at least a first stable state and a second stable state.

As described above, when the protection layer 62 used in the present invention is caused to have a pencil hardness of HB or harder, the breakage of the protection layer 62 due to pressing by particulate spacers may be avoided, whereby the dissolution of the dye or pigment in the color filter into the FLC 65 is prevented, so that the problem arising from the decrease in resistance of the FLC is prevented from occurring.

Figure 7:
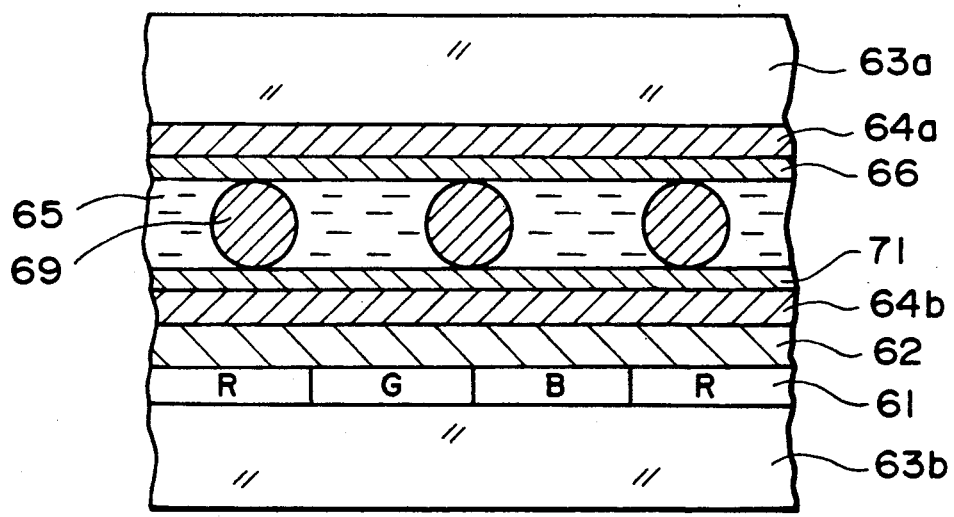

In a liquid crystal device shown in FIG. 7, the color filter layer 61 is formed to have substantially the same thickness, so that even if a protection layer 62, transparent electrodes 64b, and an alignment control film 71 are successively formed thereon, the surface contacting the FLC 65 is kept substantially flat.

In the present invention, because of the flattening as described above, steps or stepwise elevations possibly formed on the surface contacting the FLC 65 of the substrate 63b having the color filter may be suppressed to 1000 Å or less, preferably 500 Å or less. If the steps are formed to exceed 1000 Å, particularly 1200 Å, a liquid crystal device with no flattening layer results in zigzag or edge-like line defects.

The thickness of the alignment control film 71 may be set to generally 10 Å-1 μm, preferably 100 Å-3000 Å, while it depends on the thickness of the FLC layer.

FIGS. 8A-8F illustrate steps for forming color pixels of three colors R, G and B with reference to a specific embodiment. First, on a glass substrate 81 ("7059", mfd. by Corning Co.), a positive-type resist ("OFPR 77" (trade name), mfd. by Tokyo Ohka K.K.) was applied by a spinner coater to form a 1.0 μ-thick resist layer 82 (FIG. 8A). Then, the resist layer 82 was exposed to light through a mask 83 with a prescribed pattern (FIG. 8B), followed by development with a developer liquid prescribed for OFPR 77 series to form a pattern of prescribed stripes for lifting-off (FIG. 8C).

Then, the entirely of the pattern-formed face of the glass substrate 81 was exposed, and unnecessary residue of the resist at portions other than the pattern was removed from the glass substrate 81 by an oxygen plasma ashing treatment.

The glass substrate 81 provided with a pattern 82a for lifting-off was placed at a prescribed position in a vacuum evaporator, in which was further disposed a molybdenum boat for an evaporation source containing nickel phthalocyanine as an evaporating blue colorant. Then, the nickel phthalocyanine was evaporated at 470° C. to be deposited in a thickness of 5500 Å on the face of the substrate 81 having the lifting-off pattern to form a colorant layer 84 (FIG. 8D).

Then, the substrate 81 having the lifting-off pattern 82a and the colorant layer was dipped in the developer liquid for OFPR 77 series under stirring for 5 minutes to remove the resist pattern 82a together with the portion of the colorant layer 84a deposited on the pattern from the substrate, thereby to form a blue stripe filter 84b.

Then, green and red stripe filters were respectively prepared by repeating the steps as described with reference to FIGS. 8A-8E.

Lead phthalocyanine was used as a green colorant for vapor deposition to form a 5500 Å-thick green stripe filter 84g.

Then, an anthoraquinone-base red-colorant for vapor deposition was evaporated to form a red stripe filter 84r.

In the manner as described above, a color filter having substantially the same thickness of B, G and R stripes as shown in FIG. 8F was prepared.

Now, the operation principle of a ferroelectric liquid crystal device will be supplemented in some detail.

Figure 9:
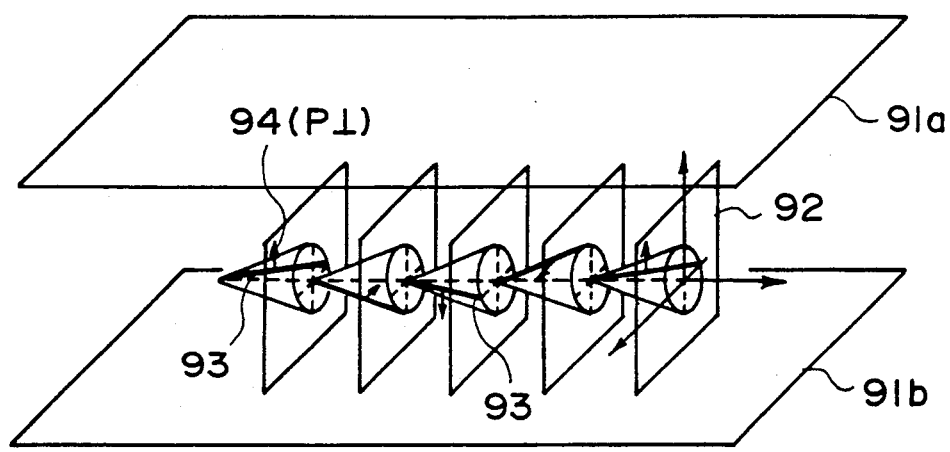
FIGS. 9 and 10 are respectively a perspective view for illustrating the operation principle of a ferroelectric liquid crystal device used in the present invention.
Figure 10:
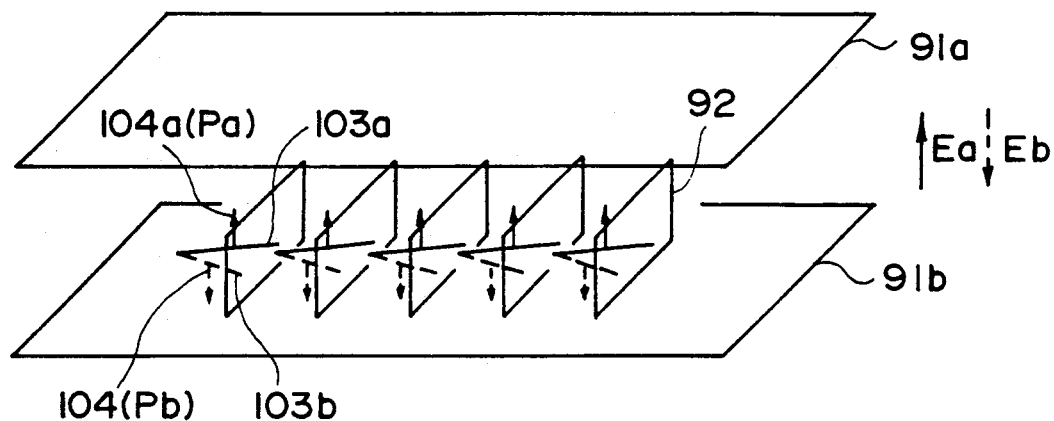

Referring to FIG. 9, there is schematically shown an example of an FLC cell for explanation of the operation thereof. Reference numerals 91a and 91b denote substrates (glass plates) on which a transparent electrode of, e.g., $In_2O_3$, $SnO_2$, ITO (indium-tin-oxide), etc., is disposed, respectively. A liquid crystal of, e.g., an SmC*-phase in which liquid crystal molecular layers 92 are oriented perpendicular to surfaces of the glass plates is hermetically disposed therebetween. Full lines 93 show liquid crystal molecules. Each liquid crystal molecule 93 has a dipole moment (P⊥) 94 in a direction perpendicular to the axis thereof. When a voltage higher than a certain threshold level is applied between electrodes formed on the substrates 91a and 91b, a helical structure of the liquid crystal molecules 93 is unwound or released to change the alignment direction of respective liquid crystal molecules 93 so that the dipole moments (P⊥) 94 are all directed in the direction of the electric field. The liquid crystal molecules 93 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device, of which optical characteristics vary depending upon the polarity of an applied voltage. Further, when the thickness of the liquid crystal cell is sufficiently thin (e.g., 1μ), the helical structure of the liquid crystal molecules is unwound to provide a non-helical structure even in the absence of an electric field whereby the dipole moment assumes either of the two states, i.e., Pa in an upper direction 104a or Pb in a lower direction 104b as shown in FIG. 10. When electric field Ea or Eb higher than a certain threshold level and different from each other in polarity as shown in FIG. 10 is applied to a cell having the above-mentioned characteristics, the dipole moment is directed either in the upper direction 104a or in the lower direction 104b depending on the vector of the electric field Ea or Eb. In correspondence with this, the liquid crystal molecules are oriented in either of a first stable state 103a and a second stable state 103b.

When the above-mentioned FLC is used as an optical modulation element, it is possible to obtain two advantages. First is that the response speed is quite fast. Second is that the orientation of the liquid crystal shows bistability. The second advantage will be further explained, e.g., with reference to FIG. 10. When the electric field Ea is applied to the liquid crystal molecules, they are oriented in the first stable state 103a. This state is stably retained even if the electric field is removed. On the other hand, when the electric field Eb of which direction is opposite to that of the electric field Ea is applied thereto, the liquid crystal molecules are oriented to the second stable state 103b, whereby the directions of molecules are changed. This state is also stably retained even if the electric field is removed. Further, as long as the magnitude of the electric field Ea or Eb being applied is not above a certain threshold value, the liquid crystal molecules are placed in the respective orientation states. In order to effectively realize high response speed and bistability, it is preferable that the thickness of the cell is as thin as possible and generally 0.5 to 20μ, particularly 1 to 5μ. A liquid crystal-electrooptical device having a matrix electrode structure in which the ferroelectric liquid crystal of this kind is used is proposed, e.g., in the specification of U.S. Pat. No. 4,367,924 by Clark and Lagerwall.

As an FLC used in the present invention, chiral smectic liquid crystals are most preferred, among which liquid crystals showing chiral smectic C phase (SmC*), H phase (SmH*), I phase (SmI*), F phase (SmF*) or G phase (SmG*) are suitable.

More specifically, examples of the FLC usable in the present invention include p-decyloxybenzylidene- p'-amino-2-methylbutylcinnamate (DOBAMBC), p-hexyloxybenzylidene-p'-amino-2-chloropropylcinnamate (HOBACPC), p-decyloxybenzylidene-p'-amino-2-methylbutyl-α-cyanocinnamate (DOBAMBCC), p-tetradecyloxybenzylidene-p'-amino-2-methylbutyl-α-cyanocinnamate (TDOBAMBCC), p-octyloxybenzylidene-p'-amino-2-methylbutyl-α-chlorocinnamate (OOBAMBCC), p-octyloxybenzylidene-p'- amino-2-methylbutyl-α-methylcinnamate, 4,4'-azoxycinnamic acid-bis(2-methylbutyl)ester, 4-o-(2-methyl)butylresorcylidene-4'-octylaniline (MBRA 8), 4-(2'-methylbutyl)-phenyl-4'-octyloxybiphenyl-4-carboxylate, 4-hexyloxyphenyl-4-(2''-methylbutyl)biphenyl-4'-carboxylate, 4-octyloxyphenyl-4-(2''-methylbutyl)biphenyl-4'-carboxylate, 4-heptylphenyl-4-(4''-methylhexyl)biphenyl-4'-carboxylate, 4-(2''-methylbutyl)phenyl-4-(4'''-methylhexyl)biphenyl-4'-carboxylate, etc.

These FLC compounds may be used singly or in combination of two or more species, or may be mixed with another non-ferroelectric liquid crystal, such as nematic liquid crystal, cholesteric liquid crystal (chiral nematic liquid crystal) or smectic liquid crystal. Further, the above mentioned FLC may be one having a helical structure as shown in FIG. 9 or one having a non-helical structure as shown in FIG. 10. Particularly, in a case of a non-helical structure, it is preferred to use a driving method wherein an FLC having a negative dielectric anisotropy is used and an AC bias is applied between two electrodes to provide a non-helical structure with bistability. Further, in this instance, it is also possible to use a driving method wherein such an AC bias is applied to an FLC device having a liquid crystal layer thin enough to provide a non-helical structure by itself.

Hereinbelow, the present invention will be explained with reference to specific examples.

EXAMPLE 1

A square glass plate provided with ITO stripe electrodes each having a width of 62.5 μm and at a pitch of 100 μm was provided and disposed with its side having the ITO electrodes directed downward in a vacuum evaporator, in which a copper phthalocyanine pigment (blue) was vapor-deposited in a thickness of 2000 Å. Then, the vapor-deposited layer of copper phthalocyanine was patterned by a prescribed photolithographic process.

Then, a 5 wt. % solution of a polyamic acid, a polyimide precursor (dehydro-condensation product of pyromellitic dianhydride and 4,4′-diaminodiphenyl ether) in N-methylpyrrolidone was spinner-coated and heat-cured to form an 800 Å-thick film. The surface of the polyimide film after the heat curing was rubbing-treated with velvet in parallel with the longitudinal direction of the stripe electrodes. The thus prepared electrode plate is referred to as the electrode plate A.

On the other hand, an electrode plate B was prepared in quite the same manner as above except that the preparation of the copper phthalocyanine color filter layer was omitted and the rubbing direction was transverse to the longitudinal direction of the stripe electrodes.

Then, on the peripheral portion except for a part forming an injection port of the electrode plate A, a thermosetting epoxy adhesive was applied by screen printing, and the electrode plate A and the electrode plate B were superposed with each other so that their stripe electrode pattern crossed at right angles while retaining the spacing therebetween at 2 μm with polyimide spacers.

Into the thus prepared cell, the following liquid crystal composition A (showing SmC* phase at 20° C.–78° C.) in isotropic phase was injected through the injection port, which was then sealed. The cell was then gradually cooled at a rate of 0.5° C./hr and maintained at 40° C., where the cell after being provided with a pair of polarizers arranged in cross nicols was observed through a microscope. As a result, a monodomain of SmC* phase assuming a non-helical structure with no alignment defects was observed to be formed.

TABLE 1

|  | Resistivity before standing | Resistivity after standing for 96 hrs. |
|---|---|---|
| Example 1 | $2.5 \times 10^{10}$ Ω · cm | $1.7 \times 10^{10}$ Ω · cm |
| Comparative Example 1 | $2.5 \times 10^{10}$ Ω · cm | $7 \times 10^{7}$ Ω · cm |

Figure 11:
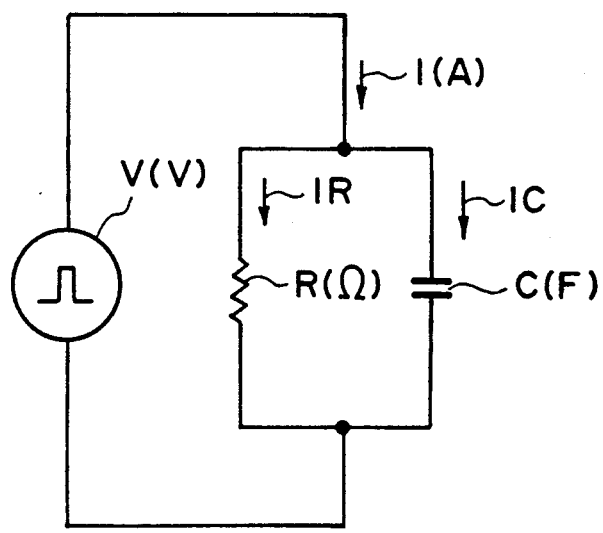
FIG. 11 illustrates a circuit for measuring a resistance used in an example.

The resistivity values (Ω·cm) measured with respect to the above examples and also with respect to the other examples appearing hereinafter were obtained by applying rectangular pulses according to the dual frequency method by using a circuit as shown in FIG. 11, and calculating $R_{LC}$ (Ω·cm) from the following formula. In the measurement, the conditions of $f_1 = 32$ Hz, $f_2 = 64$ Hz and V = 10 volts were used.

$$I = I_C I_R = 4f \cdot C \cdot V + V/R_{LC},$$

wherein
V: measured voltage,
f: frequency of a rectangular pulse,
$I_C$: current value with respect to a capacitive component,
$I_R$: current value with respect to an R component,
$C_{LC}$: capacitance of liquid crystal,
$R_{LC}$: resistance of liquid crystal (Ω),
$C_{LC}$: $R_{LC}$ S/d
d: liquid crystal layer thickness (cell gap),
S: electrode area.
For different f values, $$I_1 = 4f_1 \cdot C_{LC} \cdot V + V/R_{LC}$$

LC Composition A

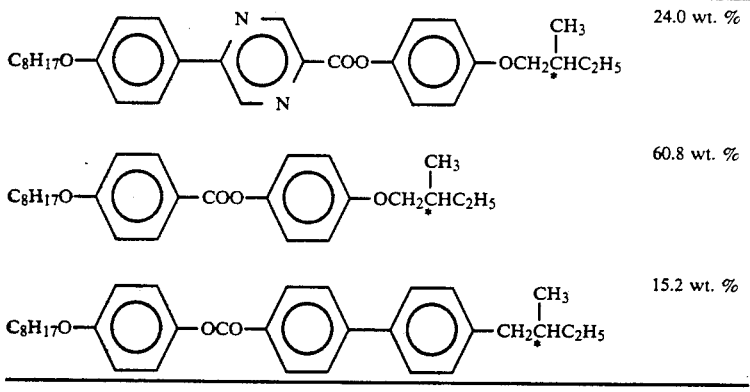

| | |
|---|---|
| $C_8H_{17}O$—⟨⟩—N=⟨⟩—COO—⟨⟩—OCH$_2$CH(CH$_3$)C$_2$H$_5$ | 24.0 wt. % |
| $C_8H_{17}O$—⟨⟩—COO—⟨⟩—OCH$_2$CH(CH$_3$)C$_2$H$_5$ | 60.8 wt. % |
| $C_8H_{17}O$—⟨⟩—OCO—⟨⟩—CH$_2$CH(CH$_3$)C$_2$H$_5$ | 15.2 wt. % |

COMPARATIVE EXAMPLE 1

A liquid crystal cell for comparison was prepared in quite the same manner as in the above Example 1 except that a monolayer of a silane coupling agent was used instead of the polyimide protection layer, whereby a monodomain of SmC* phase was observed to be formed similarly as in Example 1.

The two types of liquid crystal cells prepared in Example 1 and Comparative Example 1 were allowed to stand for 96 hours under the conditions of a temperature of 80° C. and a relative humidity of 60%. Thereafter, the resistivities of the respective liquid crystal layers were measured. The results are shown in the following Table 1.

$$I_2 = 4f_2 \cdot C_{LC} \cdot V + V/R_{LC}$$

Then, the respective liquid crystal display cells after standing for 96 hours were, after disposition of cross nicol polarizers, driven by applying a signal of 20 volts between the electrodes, whereby the liquid crystal cell according to Example 1 provided a display quality including a good contrast similar to that obtained before the standing, whereas the one according to Comparative Example 1 caused undesirable inversion phenomenon compared with that obtained before the standing.

EXAMPLES 2 AND 3

Liquid crystal cells were prepared in quite the same manner as in Example 1 except that lead phthalocyanine (Example 2) and Perylene Red (Example 3) were respectively used instead of copper phthalocyanine used in Example 1. The liquid crystal cells were subjected to the standing or durability test as described above, whereby the results similar to those in Example 1 were obtained.

EXAMPLE 4

A liquid crystal cell was prepared in the same manner as in Example 1 except that a colored polyimide film prepared as described below was used as a color filter layer instead of the copper phthalocyanine vapor-deposited layer, whereby similar results as those obtained in Example 1 were obtained.

PROCEDURE FOR PREPARATION OF THE COLORED POLYIMIDE FILM

In a four-necked flask provided with a stirrer, a reflux cooler and a thermometer, 10 parts of copper phthalocyanine was fully dissolved in 100 parts of chlorosulfonic acid, and 21 parts of thionyl chloride was added. The mixture was gradually raised in temperature and maintained at 112°-113° C. for 4 hours. After cooling, ice was thrown thereinto, followed by filtration and washing with ice and water. The resultant paste was taken in a four-necked flask provided with a reflux cooler, 100 parts of water and 21 parts of N-diethylaminoethylamine were added thereto, and the mixture was stirred for 12 hours at room temperature and heated at 60° C. for 1 hour. After the completion of the reaction, the product was subjected to filtration, washing with water and drying to obtain blue powder of a copper phthalocyanine derivative. The blue powder was subjected to elementary analysis, whereby the compound was found to be a copper phthalocyanine derivative to which about three of the following group had been introduced:

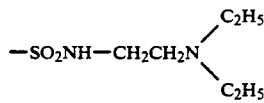

Then, a mixture of 0.1 part of the above copper phthalocyanine derivative and 16.5 parts of α-type copper phthalocyanine was dispersed in a solution of 100 parts of a polyimide precursor (Semicofine SP-510, mfd. by Toray K.K.) and 200 parts of N,N-dimethylformamide under sufficient stirring.

The dispersion liquid was applied by a spinner coater to provide a 500 Å-thick colored polyimide film after heat-curing.

EXAMPLE 5

An FLC device was prepared in the same manner as in Example 1 except that the electrode plate was further provided with a 1 μm-thick layer of a negative resist resin ("ODUR", mfd. by Tokyo Ohka K.K.) as a second protection layer between the color filter layer and the polyimide layer, and the device was subjected to the durability test. The results are shown in the following Table 2.

TABLE 2

| Resistivity before standing | Resistivity after standing for 96 hours |
|---|---|
| $2.5 \times 10^{10}$ Ω·cm | $2.1 \times 10^{10}$ Ω·cm |

EXAMPLE 6

Electrode plates A and B were prepared in the same manner as in Example 1.

Then, 40 mg of alumina beads having an average particle size of about 5 μm were dispersed in 400 cc of methanol, and the above electrode plate B was dipped in the resultant dispersion, pulled up and dried to provide the electrode plate B with alumina beads dispersed thereon.

Then, on the peripheral portion except for a part forming an injection port of the electrode plate A, a thermosetting epoxy adhesive was applied by screen printing, and the electrode plate A and the electrode plate B prepared above were superposed with each other. Then, while applying an external pressure of 5 kg/cm² uniformly from outside the electrode plate A, the adhesive was cured under the pressure.

Into the thus prepared cell, the above mentioned liquid crystal composition A was injected through the injection port, which was then sealed up. The cell was gradually cooled and maintained at 40° C., where the cell after being provided with a pair of polarizers arranged in cross nicols was observed through a microscope. As a result, a monodomain of SmC* phase assuming a non-helical structure with no alignment defects was observed to be formed. COMPARATIVE EXAMPLE 2

A liquid crystal cell for comparison was prepared in quite the same manner as in the above Example 6 except that glass fiber of about 5 μm diameter was used instead of the alumina beads, whereby a monodomain of SmC* phase was observed to be formed similarly as in Example 6.

The two types of liquid crystal cells prepared in Example 6 and Comparative Example 2 were allowed to stand for 96 hours under the conditions of a temperature of 80° C. and a relative humidity of 60%. Thereafter, the resistivities of the respective liquid crystal layers were measured. Then results are shown in the following Table 3.

TABLE 3

|  | Resistivity before standing | Resistivity after standing for 96 hrs. |
|---|---|---|
| Example 6 | $2.5 \times 10^{10}$ Ω·cm | $2.5 \times 10^{10}$ Ω·cm |
| Comparative Example 2 | $2.5 \times 10^{10}$ Ω·cm | $4.1 \times 10^{8}$ Ω·cm |

EXAMPLE 7

A liquid crystal cell for comparison was prepared in quite the same manner as in the above Example 6 except that alumina beads having an average particle size of about 1 μm were used instead of the alumina beads having an average particle size of about 5 μm, whereby a monodomain of SmC* phase was observed to be formed similarly as in Example 6.

The liquid crystal cell was allowed to stand for 96 hours under the conditions of a temperature of 80° C. and a relative humidity of 60%. Thereafter, the resistivity of the respective liquid crystal layers was measured in the same manner, whereby the resistivity after the standing for 96 hours was $2.5 \times 10^{10}$ Ω·cm similarly as that of the initial stage.

EXAMPLES 8 AND 9

Liquid crystal cells were prepared in quite the same manner as in Example 7 except that lead phthalocyanine (Example 8) and Perylene Red (Example 9) were respectively used instead of copper phthalocyanine used in Example 7. The liquid crystal cells were subjected to the standing or durability test as described above, whereby the results similar to those in Example 7 were obtained.

EXAMPLE 10

A liquid crystal cell was prepared in the same manner as in Example 7 except that a colored polyimide film as used in Example 1 was used as a color filter layer instead of the copper phthalocyanine vapor-deposited layer, whereby similar results as those obtained in Example 7 were obtained.

As described hereinabove, the present invention provides a stable color display for a long period of use of a liquid crystal device for color display, particularly for a color television display panel. Incidentally, when a protection layer as described above is omitted from a conventional dot matrix-type liquid crystal device using a TN-liquid crystal and provided with a color filter layer, the TN-liquid crystal layer also causes a decrease in resistance. However, in a conventional TN-mode device, a display state different from that obtained corresponding to written information does not result at the time of falling-down of a writing pulse, whereby no consideration on the decrease in resistance is required. In contrast thereto, in an FLC device, the generation of a reverse polarity of voltage due to discharge from a dielectric layer at the time of falling-down of a writing pulse causes a display or written state different from a writing signal. This has been a great problem in a color display using FLC. The present invention provides an effective solution to this problem.

EXAMPLE 11

A polyetheramide-imide resin ("HL-1100" (trade name), mfd. by Hitachi Kasei K.K.) was applied by means of a spinner coater on a glass plate and heat-cured to form a 1 μm-thick film. The surface hardness of the film was measured to be a pencil hardness of 5H according to JIS K 5401.

Separately, copper phthalocyanine pigment was vapor-deposited in a thickness of 2000 Å on a square glass plate by means of a vacuum evaporator. On the deposited copper phthalocyanine pigment layer, the above mentioned polyetheramide-imide resin was formed in a thickness of 1 μm in the manner as described above.

Then, on the polyetheramide-imide layer, a 500 Å-thick ITO film was formed by sputtering and patterned into stripe electrodes. Further thereon, a polyimide-forming solution ("PIQ" (trade name), mfd. by Hitachi Kasei K.K.) was applied by means of a spinner coater rotating at 3000 rpm and heated at 150° C. for 30 minutes to form a 2000 Å-thick polyimide film. Thereafter, the surface of the polyimide film was rubbing-treated in parallel with the longitudinal direction of the stripe electrodes to provide a first electrode plate.

Separately, a second electrode plate was prepared in the same manner as described above for preparation of the first electrode plate except that the copper phthalocyanine vapor-deposited layer was omitted and the rubbing direction was perpendicular to the longitudinal direction of the stripe electrodes.

Then, 80 mg of alumina beads having an average particle size of about 5 μm were dispersed in 400 cc of methanol, and the above mentioned second electrode plate was dipped in the resultant dispersion, pulled up and dried to disperse the alumina beads on the second electrode plate.

Then, on the peripheral portion except for a part forming an injection port of the first electrode plate with a color filter layer, a thermosetting epoxy adhesive was applied by screen printing, and the first and second electrode plates were superposed with each other. Then, while applying a pressure of 5 kg/cm$^2$ uniformly from outside the first electrode plate, the adhesive was cured under the pressure.

Into the thus prepared cell, the above mentioned liquid crystal composition A was injected through the injection port, which was then sealed up. The cell was gradually cooled and maintained at 40° C., where the cell after being provided with a pair of polarizers arranged in cross nicols was observed through a microscope. As a result, a monodomain of SmC* phase assuming a non-helical structure with no alignment defects was observed to be formed.

EXAMPLE 12

A liquid crystal device was prepared in the same manner as in Example 11 except that polyacrylonitrile resin was used instead of the polyetheramideimide. The surface hardness of the polyacrylonitrile film was measured to be a pencil hardness of HB according to the method used in Example 11.

The liquid crystal device prepared above was observed through a cross nicol-polarizing microscope, whereby a device having no alignment defects was found to be formed without breakage of the protection film due to the bead spacers.

COMPARATIVE EXAMPLE 3

A liquid crystal device was prepared in the same manner as in Example 11 except that polyvinyl alcohol resin was used instead of the polyetheramideimide resin. The surface hardness of the polyvinyl alcohol film used herein was measured to be a pencil hardness of 2B according to the method in Example 11.

The liquid crystal device prepared above was observed through a cross nicol-polarizing microscope, whereby defects were observed and noticeable alignment defects in the liquid crystal layer were also observed at the defects.

The three liquid crystal devices prepared in Examples 11 and 12 and Comparative Example 3 were allowed to stand for 96 hours under the conditions of a temperature of 80° C. and a relative humidity of 60%. Thereafter, the resistivities of the liquid crystal layers were measured. The results are shown in the following Table 4.

TABLE 4

|  | Resistivity before standing | Resistivity after standing for 96 hrs. |
| --- | --- | --- |
| Example 11 | $2 \times 10^{11} \, \Omega \cdot cm$ | $2 \times 10^{11} \, \Omega \cdot cm$ |
| Example 12 | $2 \times 10^{11} \, \Omega \cdot cm$ | $2 \times 10^{11} \, \Omega \cdot cm$ |
| Comparative Example 3 | $2 \times 10^{11} \, \Omega \cdot cm$ | $5 \times 10^{9} \, \Omega \cdot cm$ |

The three liquid crystal cells were subjected to driving, whereby the liquid crystal cells prepared in Example 11 and 12 showed a stable driving characteristic, but the driving of the liquid crystal cell prepared in Comparative Example 3 was unstable.

As described hereinabove, when a protection layer having a pencil hardness of HB or harder is disposed on a color filter layer according to the present invention, the breakage of the layer due to point-contact of bead spacers is prevented, whereby alignment defects and decrease in resistivity of liquid crystal due to the breakage can also be prevented. As a result, there is provided a reliable ferroelectric liquid crystal device which can fully exhibit the characteristics of a ferroelectric liquid crystal used.

What is claimed is:

1. A liquid crystal apparatus, comprising:
    a liquid crystal device comprising a pair of substrates, each said substrate having an electrode thereon and a ferroelectric liquid crystal disposed between the pair of substrates, at least one of the substrates having thereon a color filter layer and an insulating protection layer with a pencil hardness of HB or harder covering the color filter layer for preventing direct contact between the color filter layer and the ferroelectric liquid crystal, wherein the electrode is disposed closer to the ferroelectric liquid crystal than the color filter layer, said liquid crystal device further comprising spacer beads disposed between the substrates at an average of more than 15 beads/mm$^2$, thereby providing a substantially uniform thickness of said ferroelectric liquid crystal.
    means for applying to said electrodes in a selecting period a first voltage of at least one threshold voltage providing one orientation state of the ferroelectric liquid crystal, and a second voltage of at least another threshold voltage providing another orientation state of the ferroelectric liquid crystal, and for applying to said electrodes in a non-selecting period a third voltage between one and the other threshold voltages of the ferroelectric liquid crystal.

2. A liquid crystal apparatus according to claim 1, wherein said ferroelectric liquid crystal is a chiral smectic liquid crystal.

3. A liquid crystal apparatus according to claim 2, wherein said ferroelectric liquid crystal is disposed in a layer thin enough to unwind the helical structure of the chiral smectic liquid crystal.

4. A liquid crystal apparatus according to claim 1, wherein said color filter layer was provided to each pixel so as to define a color pixel unit.

5. A liquid crystal apparatus according to claim 4, wherein said at least one substrate has three types of color pixels units including a blue color pixel unit, a green color pixel unit and a red color pixel unit.

6. A liquid crystal apparatus according to claim 1, wherein said protection layer comprises a film of an inorganic insulating material.

7. A liquid crystal apparatus according to claim 6, wherein said inorganic insulating material comprises at least one member selected from the group consisting of silicon oxide, aluminum oxide, zirconium oxide, titanium oxide and magnesium fluoride.

8. A liquid crystal apparatus according to claim 1, wherein said protection layer comprises a film of an organic insulating material.

9. A liquid crystal apparatus according to claim 8, wherein said organic insulating material comprises at least one member selected from the group consisting of thermosetting polyimide, polyparaxylylene, polycarbonate, polystyrene, thermosetting acrylic resin, polyethylene and rubber-type photoresist.

10. A liquid crystal apparatus according to claim 1, wherein said color filter layer comprises colored polyimide, colored polyamide, colored polyamideimide, colored polyesterimide or colored polyester.

11. A liquid crystal apparatus according to claim 1, wherein said color filter layer comprises a dye or pigment which is not mutually soluble with the material constituting said protection layer.

12. A liquid crystal apparatus according to claim 1, which further comprises an alignment control film having a uniaxial orientation axis disposed on the electrode.

13. A liquid crystal apparatus according to claim 12, wherein said uniaxial orientation axis is a rubbing-treated axis.

14. A liquid crystal apparatus according to claim 1, wherein said insulating protection layer is disposed between the electrode and the color filter layer.

15. A liquid crystal apparatus according to claim 1, wherein said insulating protection layer is disposed on the electrode and the color filter layer.

16. A liquid crystal apparatus, comprising:
    a liquid crystal device comprising a pair of substrates respectively having scanning electrodes and signal electrodes which intersect with each other, and a ferroelectric liquid crystal disposed between the pair of substrates, at lest one of the substrates having thereon a color filter layer, and an insulating protection layer having a pencil hardness of HB or harder covering the color filter layer for preventing direct contact between the color filter layer and the ferroelectric liquid crystal wherein the electrode is disposed closer to the ferroelectric liquid crystal than the color filter layer, said liquid crystal device further comprising spacer beads disposed between the substrates at an average of more than 15 beads/mm$^2$, whereby said ferroelectric liquid crystal has a substantially uniform thickness;
    means for applying a scanning selection signal having one and the other polarity voltage relative to a scanning non-selection signal, for applying a first voltage of at least one threshold voltage providing one orientation state of the ferroelectric liquid crystal to a selected intersecting point on a selected scanning line, for applying a second voltage of at least another threshold voltage providing another orientation state of the ferroelectric liquid crystal to a non-selected intersecting point, and for applying a third voltage between one and the other threshold voltage of the ferroelectric liquid crystal to an intersecting point on a non-selected scanning line.

17. A liquid crystal apparatus according to claim 16, wherein said ferroelectric liquid crystal is a chiral smectic liquid crystal.

18. A liquid crystal apparatus according to claim 17, wherein said ferroelectric liquid crystal is disposed in a layer thin enough to unwind the helical structure of the chiral smectic liquid crystal.

19. A liquid crystal apparatus according to claim 16, wherein said particulate spacers comprises alumina beads, glass beads, silica beads, or plastic beads.

20. A liquid crystal apparatus according to claim 16, which further comprises an alignment control film having a uniaxial orientation axis disposed on the scanning or signal electrodes.

21. A liquid crystal apparatus according to claim 20, wherein said uniaxial orientation axis is a rubbing-treated axis.

22. A liquid crystal apparatus according to claim 16, wherein said insulating protection layer is disposed between the electrode and the color filter layer.

23. A liquid crystal apparatus according to claim 16, wherein said insulating protection layer is disposed on the electrode and the color filter layer.

* * * * *

UNITED STATES PATENT AND TRADEMARK OFFICE
CERTIFICATE OF CORRECTION

PATENT NO. : 5,078,475

DATED : January 7, 1992

INVENTOR(S) : NOBUYUKI SEKIMURA, ET AL.

It is certified that error appears in the above-identified patent and that said Letters Patent is hereby corrected as shown below:

Title Page:
IN [56] REFERENCES CITED

FOREIGN PATENT DOCUMENTS, "84529  9/1985  Japan" should read --84529  5/1985  Japan--.

COLUMN 1

Line 19, "in a nematic)" should read --in a capacitor. A liquid crystal (e.g., TN (twisted nematic)--.

COLUMN 2

Line 36, "respectively a perspective view" should read --perspective views--.
Line 46, ""FLC"," should read --"FLC"),--.
Line 55, "layer" should read --lower--.

COLUMN 3

Line 23, "phase $t_2$" should read --phase $t_2$.--.
Line 55, "can be" should read --can be omitted.--.
Line 56, "denote" should read --Numerals 37a and 37b denote--.

COLUMN 4

Line 1, "include," should read --include--.
Line 40, "venting" should read --vent--.

UNITED STATES PATENT AND TRADEMARK OFFICE
CERTIFICATE OF CORRECTION

PATENT NO. : 5,078,475

DATED : January 7, 1992

INVENTOR(S) : NOBUYUKI SEKIMURA, ET AL.

It is certified that error appears in the above-identified patent and that said Letters Patent is hereby corrected as shown below:

COLUMN 5

Line 23, "vlue" should read --blue-- and "green" should read --blue--.
Line 26, "are" should read --is--.
Line 50, "applied," should read --applied, so--.
Line 60, "it" should read --when it--.
Line 62, "inch" should read --inches--.

COLUMN 8

Line 1, "main," should read --main is formed,--.

COLUMN 9

Line 57, "and" should read --or--.

COLUMN 12

Line 17, "$I=I_cI_R=4f\cdot C\cdot V+V/R_{LC},$" should read --$I=I_c+I_R=4f\cdot C\cdot V+V/R_{LC},$--.

COLUMN 14

Line 28, "COMPARATIVE" should be deleted.
Line 29, "EXAMPLE 2" should be heading --COMPARATIVE EXAMPLE 2--.

COLUMN 17

Line 30, "tal." should read --tal; and--.

UNITED STATES PATENT AND TRADEMARK OFFICE
CERTIFICATE OF CORRECTION

PATENT NO. : 5,078,475

DATED : January 7, 1992

INVENTOR(S) : NOBUYUKI SEKIMURA, ET AL.

It is certified that error appears in the above-identified patent and that said Letters Patent is hereby corrected as shown below:

COLUMN 18

Line 29, "lest" should read --least--.
Line 40, "thickness;" should read --thickness; and--.
Line 63, "comprises" should read --comprise--.

Signed and Sealed this

Fourth Day of May, 1993

Attest:

MICHAEL K. KIRK

Attesting Officer

Acting Commissioner of Patents and Trademarks